No. 652,261. Patented June 26, 1900.
S. GRIFFIN.
FELLY EXPANDER.
(Application filed Jan. 26, 1900.)
(No Model.)
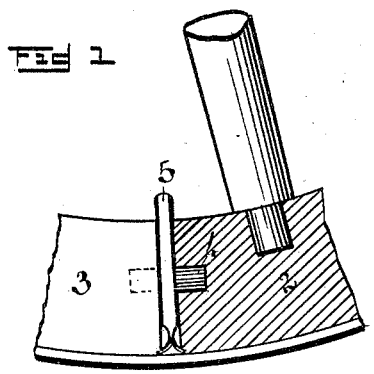
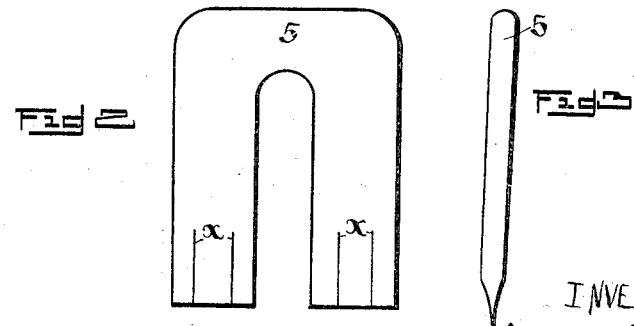
WITNESSES:
C. F. Patterson
M. A. Dodsworth
INVENTOR.
Samuel Griffin
per Geo. W. Sues.
Atty.

UNITED STATES PATENT OFFICE.

SAMUEL GRIFFIN, OF GUTHRIE, OKLAHOMA TERRITORY.

FELLY-EXPANDER.

SPECIFICATION forming part of Letters Patent No. 652,261, dated June 26, 1900.

Application filed January 26, 1900. Serial No. 2,821. (No model.)

*To all whom it may concern:*

Be it known that I, SAMUEL GRIFFIN, residing at Guthrie, in the county of Logan and Territory of Oklahoma, have invented certain useful Improvements in Felly-Expanders; and I do hereby declare that the following is a full, clear, and exact description of the invention, such as will enable others skilled in the art to which it appertains to make and use the same, reference being had to the accompanying drawings, which form a part of this specification.

This invention relates to a new and novel improvement in felly-expanders.
The object of my invention is to provide a simple device adapted to be readily inserted between the felly ends of a wheel in order to expand the fellies to tightly bind within the rim.
In the accompanying drawings I have shown in Figure 1 a broken portion of a wheel, the fellies of which are shown as expanded and locked by means of one of my improved felly-expanders. Fig. 2 shows a front view of my felly-expander, while Fig. 3 shows an edge view thereof.

In dry countries, especially during the summer months, vehicle-wheels are apt to become rickety because of the expanding of the rim, caused by the heat, and the contraction of the fellies, also caused by the heat in drying out the same. In order to prevent the tire from running off the wheel, it is found necessary to reshrink the tire and replace it upon the fellies. This is an expensive proceeding and cannot always be resorted to. The aim of my invention is to provide a wedge, of sheet or cast metal, having a seating, so as to stride the stub used in connecting one felly to the other, and one or more of which wedges can be driven between two expanding felly ends to take up the lost material. The ends of these felly-expanders are made thin and incised, so that after the felly-expander comes in contact with the metallic tire they are then thrown outward to the right and left, as shown in Fig. 1, for instance, so that the expander can only be removed by force.

My invention embodies, essentially, an approximately U-shaped wedge of any suitable size and material, the ends of which are slotted, as shown in Fig. 2, for instance, where the incisions $x\ x$ divide the stem into a plurality of small sections. If desired, it is of course understood that these slots could be eliminated; but I prefer using them, as they improve the clenching of the expander. These expanders 5 can be readily driven between two fellies, as shown in Fig. 1, and in case of the rainy season approaching, if it is found necessary, can be removed. These can be easily carried in the pocket or in the wagon. Should the fellies become loose and rattle, it is but the work of an instant to insert one of these wedges, which, if desired, can be made of variable thicknesses, and drive the same forward until the tire is encountered, when the edges will be bent over to engage the fellies and so be fixed and firmly held between the fellies and practically form a part thereof.

Having thus described my said invention, what I claim as new, and desire to secure by United States Letters Patent, is—

1. In a felly-expander of the class described an approximately U-shaped member, the two stems of which are knife-edged.

2. As a new article of manufacture a U-shaped wedge of any suitable size or material, the two stems of which are incised, as and for the purpose set forth.

SAMUEL GRIFFIN.

Witnesses:
THOMAS MCFADDEN,
CARLOS O. FISH.